United States Patent
Haberle et al.

(10) Patent No.: US 11,873,747 B2
(45) Date of Patent: Jan. 16, 2024

(54) EXHAUST GAS HEATER

(71) Applicant: Purem GmbH, Neunkirchen (DE)

(72) Inventors: Jürgen Haberle, Stuttgart (DE); Arnulf Spieth, Hochdorf (DE); Jochen Hammer, Stuttgart (DE); Fabian Frobenius, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/822,478

(22) Filed: Aug. 26, 2022

(65) Prior Publication Data

US 2023/0067544 A1    Mar. 2, 2023

(30) Foreign Application Priority Data

Aug. 26, 2021   (DE) .................. 10 2021 122 083.1

(51) Int. Cl.
| | |
|---|---|
| *F01N 3/00* | (2006.01) |
| *F01N 3/027* | (2006.01) |
| *F01N 3/20* | (2006.01) |
| *H05B 3/26* | (2006.01) |

(52) U.S. Cl.
CPC ........... *F01N 3/027* (2013.01); *F01N 3/2013* (2013.01); *H05B 3/265* (2013.01); *F01N 2240/16* (2013.01); *H05B 2203/022* (2013.01)

(58) Field of Classification Search
CPC .... F01N 3/027; F01N 3/2013; F01N 2240/16; H05B 3/265; H05B 2203/022
See application file for complete search history.

(56) References Cited

U.S. PATENT DOCUMENTS

| | | | | |
|---|---|---|---|---|
| 4,449,016 A | * | 5/1984 | Best | H05B 3/32 |
| | | | | 174/138 J |
| 4,548,625 A | * | 10/1985 | Ishida | F01N 3/027 |
| | | | | 60/303 |
| 4,671,058 A | * | 6/1987 | Yoshida | F01N 3/027 |
| | | | | 219/205 |
| 4,723,973 A | * | 2/1988 | Oyobe | F01N 3/027 |
| | | | | 60/303 |
| 10,598,064 B2 | * | 3/2020 | Everly | F01N 3/2013 |
| 2014/0190151 A1 | * | 7/2014 | Culbertson | H05B 3/44 |
| | | | | 60/303 |
| 2017/0273146 A1 | * | 9/2017 | Everly | H05B 3/06 |
| 2020/0072107 A1 | * | 3/2020 | Aufranc | F01N 3/2013 |
| 2020/0284179 A1 | * | 9/2020 | Swanson | G01F 1/68 |

(Continued)

FOREIGN PATENT DOCUMENTS

| | | | |
|---|---|---|---|
| DE | 202020104976 U1 | * | 11/2020 |
| DE | 10 2021 109 568 A1 | | 9/2022 |

(Continued)

*Primary Examiner* — Matthew T Largi
(74) *Attorney, Agent, or Firm* — Walter Ottesen, P.A.

(57) ABSTRACT

An exhaust gas heater for an exhaust gas system of an internal combustion engine includes a carrier arrangement and a heat conductor arrangement which is carried on the carrier arrangement and which has at least one heat conductor through which current flows. At least one heat conductor is carried with respect to the carrier arrangement via at least one carrier arrangement support unit in an electrically insulated manner. At least one carrier arrangement support unit includes a carrier arrangement support element having a curved support face.

8 Claims, 4 Drawing Sheets

(56) References Cited

U.S. PATENT DOCUMENTS

2021/0123369 A1\* 4/2021 Sommier .............. F01N 3/2825
2021/0332730 A1 10/2021 Kurpejovic et al.

FOREIGN PATENT DOCUMENTS

| EP | 3 901 433 A1 | 10/2021 |
|---|---|---|
| JP | 59-170615 U | 11/1984 |
| JP | 60-78918 U | 6/1985 |

\* cited by examiner

EXHAUST GAS HEATER

CROSS REFERENCE TO RELATED APPLICATION

This application claims priority of German patent application no. 10 2021 122 083.1, filed Aug. 26, 2021, the entire content of which is incorporated herein by reference.

TECHNICAL FIELD

The present disclosure relates to an exhaust gas heater via which in an exhaust gas system of a motor vehicle heat can be transmitted to the exhaust gas which is flowing therein and which is discharged from an internal combustion engine in order, in particular during a start phase of the operation of an internal combustion engine, to thereby bring system regions which are arranged downstream with respect to the exhaust gas heater, such as, for example, catalytic converters or particulate filters, more rapidly to operating temperature.

BACKGROUND

The subsequently published German patent application DE 10 2021 109 568 discloses an exhaust gas heater, in which between two substantially plate-like carrier elements of a carrier arrangement which are made from sheet metal material two heat conductors of a heat conductor arrangement, which are provided via separation from a flat material and which are constructed in a substantially plate-like or planar manner, are arranged successively in an exhaust gas main flow direction. As a result of a plurality of connection elements which are constructed in a bolt-like manner, the layered construction of carrier elements and heat conductors which are arranged therebetween is held together. In order to achieve an electrical insulation of the heat conductors with respect to the carrier elements or also with respect to each other, a plurality of support elements made of electrically insulating material, for example, ceramic material, are arranged in each case therebetween.

SUMMARY

An object of the present disclosure is to provide an exhaust gas heater in which the load which occurs in the region of support elements for the heat conductor elements is reduced.

According to the disclosure, this object is achieved with an exhaust gas heater for an exhaust gas system of an internal combustion engine, including a carrier arrangement and a heat conductor arrangement which is carried on the carrier arrangement and which has at least one heat conductor through which current flows, wherein at least one heat conductor is carried with respect to the carrier arrangement via at least one carrier arrangement support unit in an electrically insulated manner, wherein at least one carrier arrangement support unit includes at least one carrier arrangement support element having a curved support face.

As a result of the provision of an in particular convex-curved or spherical support face, a relative movement which is carried out in the manner of a rolling movement is enabled between the carrier arrangement and the heat conductor arrangement in the region of the mutual support thereof so that loads which lead to damage in particular of a support unit can be prevented.

In particular, there may be provision in this instance for at least one, preferably each carrier arrangement support unit to include a first carrier arrangement support element having a convex-curved first support face and a second carrier arrangement support element having a second support face which is supported on the first support face and which is curved in a concave manner. During the construction of an exhaust gas heater according to the disclosure, in at least one, preferably each carrier arrangement support unit, the two carrier arrangement support elements thereby cooperate with the support faces thereof which are in mutual abutment and which are curved in a convex or concave manner in the manner of a ball joint. This means that the components of the exhaust gas heater which are supported with respect to each other by the carrier arrangement support elements can pivot locally with respect to each other without excessive loads which lead to damage thereto occurring on carrier arrangement support elements which are constructed in this manner.

In order to achieve a stable support with respect to a respective heat conductor, in at least one, preferably each carrier arrangement support unit, a carrier arrangement support element may have a substantially non-curved heat conductor support face. A planar contact which distributes the loads which occur in a uniform manner is consequently provided and cannot lead to an overload since at the other side in each case the cooperation which is produced in the manner of a ball joint with the other carrier arrangement support element is provided.

Furthermore, for stable support with respect to the carrier arrangement there may be provision in at least one, preferably each carrier arrangement support unit, for a carrier arrangement support element to have a substantially non-curved carrier arrangement support face.

In order to ensure electrical insulation, it is proposed that in at least one, preferably each carrier arrangement support unit, at least one, preferably each carrier arrangement support element is made from electrically insulating material, for example, ceramic material.

With a structure which requires a smaller number of components, in at least one, preferably each carrier arrangement support unit, a carrier arrangement support element may be provided by the carrier arrangement.

For a stable retention of the heat conductor arrangement on the carrier arrangement, the carrier arrangement may include two carrier elements which receive the heat conductor arrangement between them in the direction of an exhaust gas heater longitudinal axis which substantially corresponds to an exhaust gas main flow direction, wherein the heat conductor arrangement is supported with respect to each carrier element via at least one carrier arrangement support unit.

The integration of a carrier arrangement support unit function in the carrier arrangement can be achieved in that, in at least one, preferably each carrier arrangement support unit, a carrier arrangement support element is provided by a carrier element.

For an efficient heating operation, in the exhaust gas heater according to the disclosure the heat conductor arrangement may include at least two heat conductors which are arranged successively in the direction of the exhaust gas heater longitudinal axis, wherein a first one of the heat conductors is supported via at least one carrier arrangement support unit with respect to one of the carrier elements and a second one of the heat conductors is supported via at least one carrier arrangement support unit with respect to the other of the carrier elements, and wherein at least one heat conductor support unit is arranged between heat conductors which are directly adjacent to each other in the direction of the exhaust gas heater longitudinal axis.

In order in this instance to ensure stable, electrically insulating support of directly mutually adjacent heat conductors, it is proposed that at least one, preferably each heat conductor support unit include at least one heat conductor support element which is made from electrically insulating material and/or which includes in association with each heat conductor which is supported thereon a substantially planar heat conductor support face.

A stable retention of the carrier arrangement with the heat conductor arrangement can be achieved in that the heat conductor arrangement is connected to the carrier arrangement via at least one connection element, preferably a plurality of connection elements.

In this instance, a defined positioning of a respective carrier arrangement support unit can be supported by a connection element extending through at least one, preferably each carrier arrangement support unit.

In another embodiment, a greater freedom in terms of shaping and also positioning of a respective carrier arrangement support unit can be achieved by a connection element not extending through at least one, preferably each carrier arrangement support unit.

It should be noted that a corresponding configuration in the positioning with respect to one or more connection elements can also be produced with a respective heat conductor support unit.

The disclosure further relates to an exhaust gas system for an internal combustion engine having at least one exhaust gas heater with a configuration according to the disclosure.

BRIEF DESCRIPTION OF THE DRAWINGS

The invention will now be described with reference to the drawings wherein.

DESCRIPTION OF THE PREFERRED EMBODIMENTS

Figure 1:
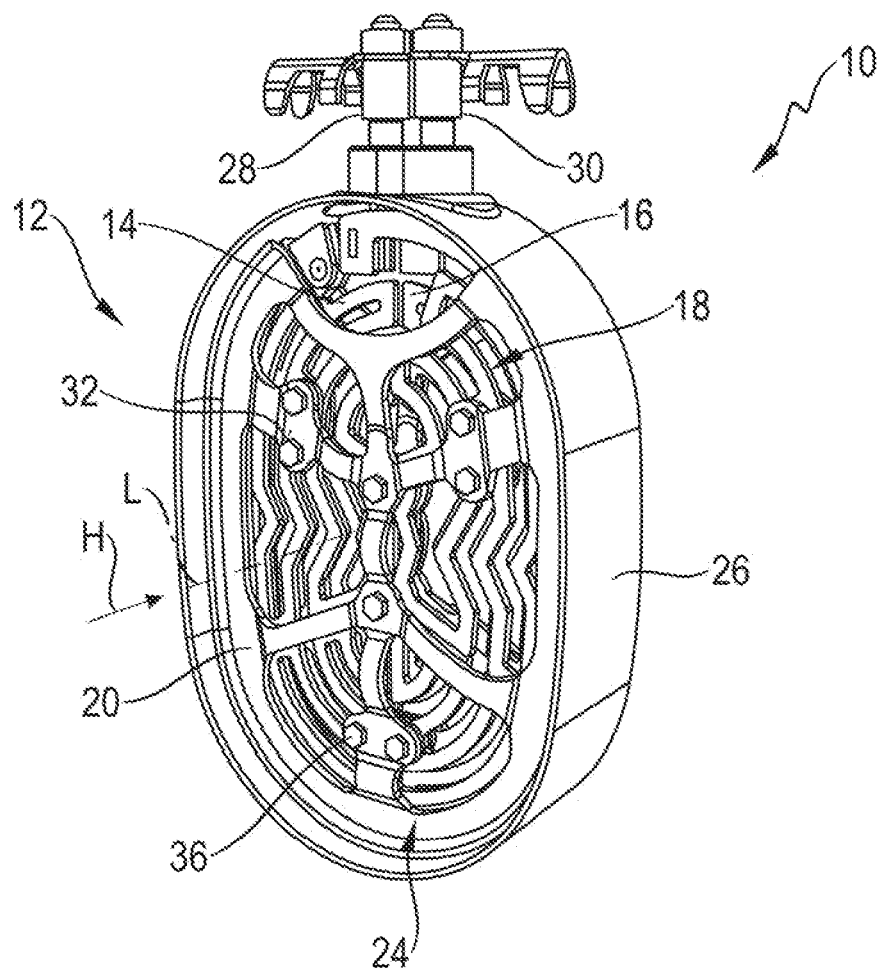
FIG. 1 shows a perspective view of an exhaust gas heater.
Figure 2:
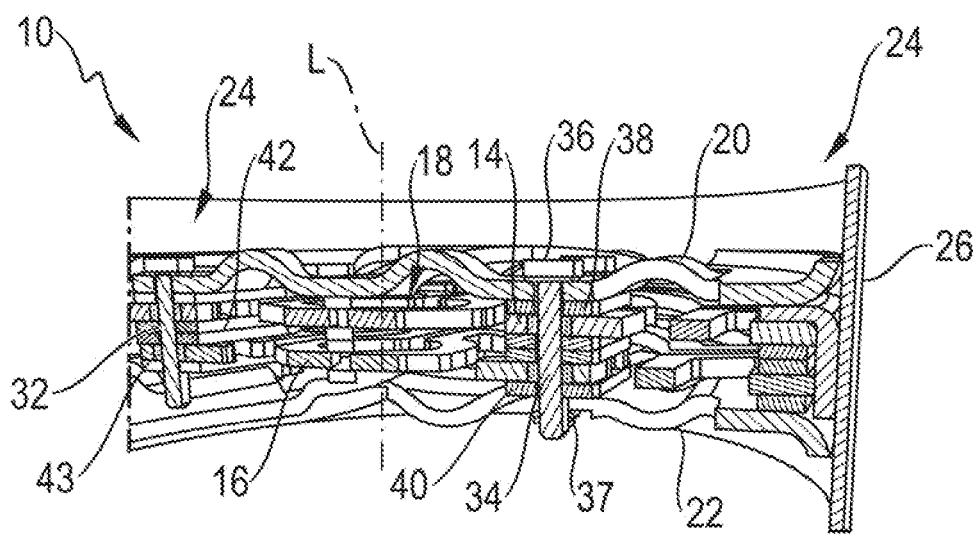
FIG. 2 shows a longitudinal sectioned view of the exhaust gas heater of FIG. 1.

FIGS. 1 and 2 illustrate an exhaust gas heater 10 for an exhaust gas system 12 of an internal combustion engine, for example, in a motor vehicle. Exhaust gas can flow through the exhaust gas heater 10 in an exhaust gas main flow direction H in the exhaust gas system 12 and the exhaust gas heater 10 has two heat conductors 14, 16 of a heat conductor arrangement which is generally designated 18, which heat conductors are arranged successively in the direction of an exhaust gas heater longitudinal axis L and can consequently be flowed around successively by exhaust gas flowing substantially in the exhaust gas main flow direction H. The heat conductors 14, 16 are constructed in a substantially plate-like manner or from flat material and can be produced with the structure thereof which is provided with a plurality of portions which extend in a meandering structure via separation from a flat material blank, in particular a metal blank.

At the sides of the two heat conductors 14, 16 facing away from each other in the exhaust gas heater longitudinal direction L, substantially plate-like carrier elements 20, 22 of a carrier arrangement which is generally designated 24 are provided. On the outer circumferential region thereof, the plate-like carrier elements 20, 22 are secured to a substantially cylindrical carrier housing 26.

The two heat conductors 14, 16 may be connected to each other in series or parallel. For electrical connection to a voltage source, there are provided two connection units 28, 30 which extend through the carrier housing 26 and which are electrically conductively connected to the heat conductors 14, 16 in the inner space which is surrounded by the carrier housing 26.

In order to obtain a stable connection, the two carrier elements 20, 22 and the heat conductors 14, 16 which are arranged therebetween and which are located directly adjacent to each other are securely connected to each other by a plurality of bolt-like connection elements 32. The connection elements 32 may, for example, be in the form of threaded bolts having a shaft 34 and a head 36. A nut element 37 may, for example, be screwed on the shaft 34 in order to clamp the layered structure including the carrier elements 20, 22 and heat conductors 14, 16 between them. The connection elements 32 may, for example, be constructed from steel material or a nickel/chromium alloy.

In order to achieve an electrical insulation of the heat conductors 14, 16 with respect to the carrier elements 20, 22 of the carrier arrangement 24 which are generally made from metal material, a carrier arrangement support unit 38 which is made from electrically insulating material, for example, ceramic material and which is constructed in a substantially plate-like manner and through which the associated connection element 32 extends in the region of an opening which is provided therein, is provided between the heat conductor 14 and the carrier element 20, for example, in association with each connection element 32. In the same manner, for example, in association with each connection element 32, a carrier element support unit 40 which is arranged between the heat conductor 16 and the carrier element 22 is provided. The carrier element support units 38, 40 which are described in greater detail below may, for example, be substantially structurally identical with respect to each other.

In order to support the two heat conductors 14, 16 which are located beside each other in an electrically insulated manner with respect to each other, a heat conductor support unit 42 is provided, for example, in association with each connection element 32. Each heat conductor support unit 42 is also constructed in a substantially plate-like manner with one or more plates and from ceramic material.

Figure 3:
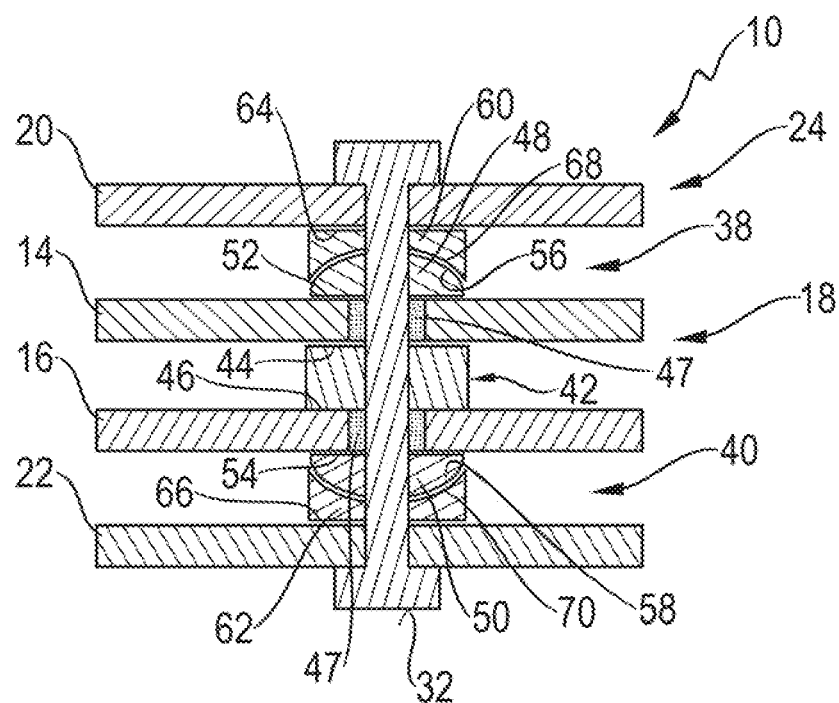
FIG. 3 shows a schematic longitudinal section of an exhaust gas heater with carrier arrangement support units which are arranged in association with a connection element.

FIG. 3 shows a schematic illustration, for an embodiment of an exhaust gas heater 10 according to the disclosure, of the region of the connection of the two carrier elements 20, 22 and the heat conductors 14, 16 which are arranged therebetween via a connection element 32. Between the two heat conductors 14, 16 it is possible to see the heat conductor support unit 42 which provides in association with each of the two heat conductors 14, 16 a substantially planar, that is, non-curved heat conductor support face 44, 46 so that a planar abutment contact between the heat conductors 14, 16 and the heat conductor support unit 42 which is constructed with one or more plates is achieved.

At locations where the connection element 32 extends through the heat conductors 14, 16, sleeve-like insulating elements 47 can be inserted into the openings formed in the heat conductors 14, 16 in order to achieve a defined positioning of the connection element 32 in the openings provided in the heat conductors 14, 16.

Each of the two carrier arrangement support units 38, 40 which are provided in association with the connection element 32 includes a first carrier arrangement support element 48, 50. Each first carrier arrangement support element 48, 50 has for support on the associated heat conductor 14, 16 a substantially planar, non-curved heat conductor support face 52, 54. At the side facing away from the respective heat conductor 14 or 16, each first carrier arrangement support element 48, 50 has, for example, a first support face 56, 58 which is substantially spherically curved or curved in a convex, ball-like manner.

Each carrier arrangement support unit 38, 40 further includes a second carrier arrangement support element 60, 62. In association with the carrier elements 20, 22, the second carrier arrangement support elements 60, 62 each have a substantially planar, non-curved carrier arrangement support face 64, 66. At the sides thereof facing away from the associated carrier element 20 or 22, the second carrier arrangement support elements 60, 62 each have a, for example, spherically concave-curved second support face 68, 70, which faces cooperate with the associated convex-curved first support faces 56, 58 in the manner of a ball joint and consequently enable a movability of the carrier elements 20, 22 with respect to the heat conductors 14, 16 which are supported with respect thereto via the carrier arrangement support units 38, 40. This is particularly advantageous since, in the variant illustrated in FIG. 3, preferably both carrier arrangement support elements 48, 50, 60, 62 of the carrier arrangement support units 38, 40 are made from electrically insulating ceramic material. Bending loads which occur during operation or also in the production process and resultant deformations can consequently be absorbed by a movability within the carrier arrangement support units 38, 40 and do not lead to damage to the carrier arrangement support elements 48, 50, 60, 62.

The fact that a respective connection element 32 extends through the carrier element support units 38, 40 or the carrier arrangement support elements 48, 50, 60, 62 in the respective apex region of the convex-curved or concave-curved support faces 56, 58 or 68, 70 provided thereon with movement play also in particular contributes to this relative movability.

Figure 4:
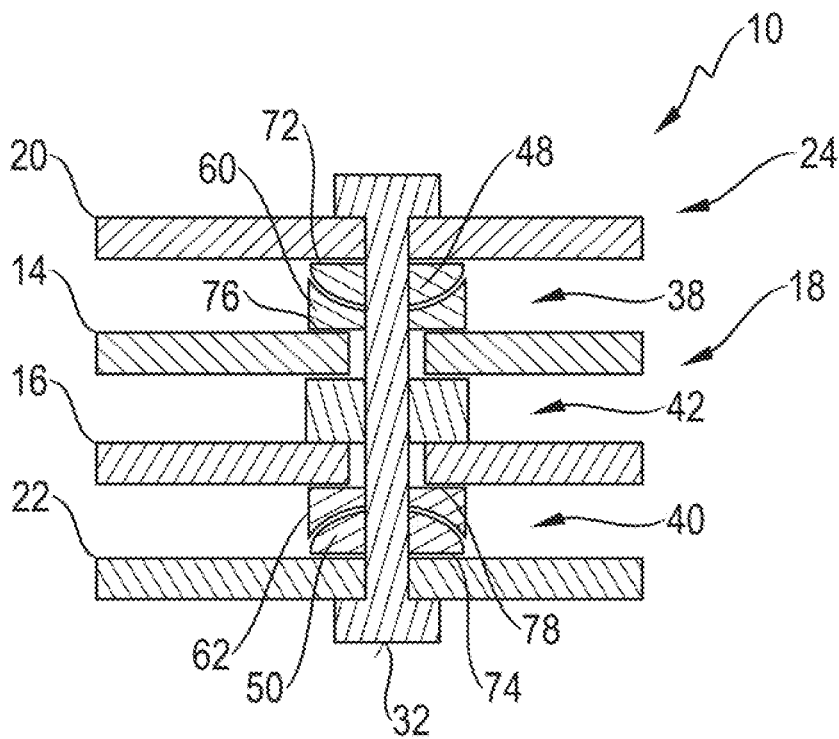
FIG. 4 is a schematic of an alternative embodiment corresponding to FIG. 3.

In the embodiment illustrated in FIG. 4, the association of the first and second carrier arrangement support elements with the carrier elements 20, 22 and the heat conductors 14, 16 is transposed. The first carrier arrangement support elements 48, 50 formed with convex-curved first support faces 56, 58 are now supported on the carrier elements 20, 22 whilst the second carrier arrangement support elements 60, 62, which are formed with concave-curved second support faces 68, 70, are arranged in association with the heat conductors 14, 16. In this embodiment, the first carrier arrangement support elements 48, 50 consequently provide at the sides thereof facing away from the respective first support faces 56, 58 substantially planar or non-curved carrier element support faces 72, 74 whilst the second carrier arrangement support elements 60, 62 which are supported on the heat conductors 14, 16 provide at the sides thereof facing away from the respective second carrier arrangement support faces 68, 70 respective substantially non-curved planar heat conductor support faces 76, 78.

Figure 5:
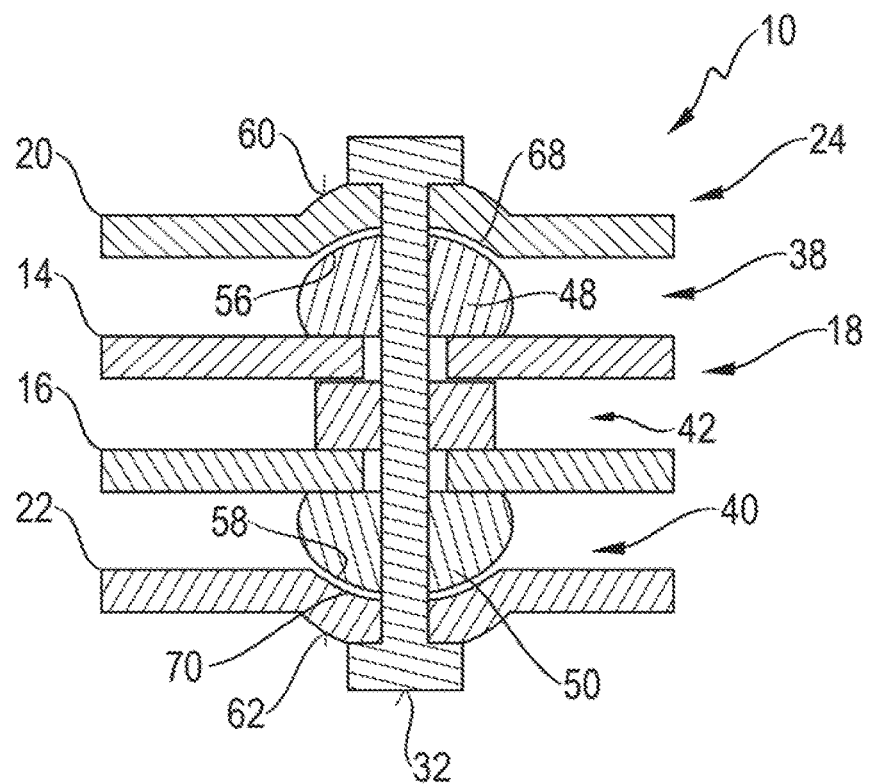
FIG. 5 is another schematic of an alternative embodiment corresponding to FIG. 3.

Another variant is illustrated in FIG. 5. In this variant, in association with each carrier arrangement support unit 38, 40 a carrier arrangement support element 60, 62 which provides a respective concave-curved second support face 68, 70 is integrated in a respective carrier element 20 or 22 or provided thereby. Since the carrier elements 20, 22 are made from metal material, for example, sheet metal or the like, this embodiment, in which a connection element 32 again extends through the carrier arrangement support units 38, 40 in the apex region of the respective convex-curved or concave-curved support faces, includes only a single first carrier arrangement support element 48, 50 which is made from electrically insulating material, for example, ceramic material, and which in this embodiment provides the convex-curved first support face 56, 58.

Figure 6:
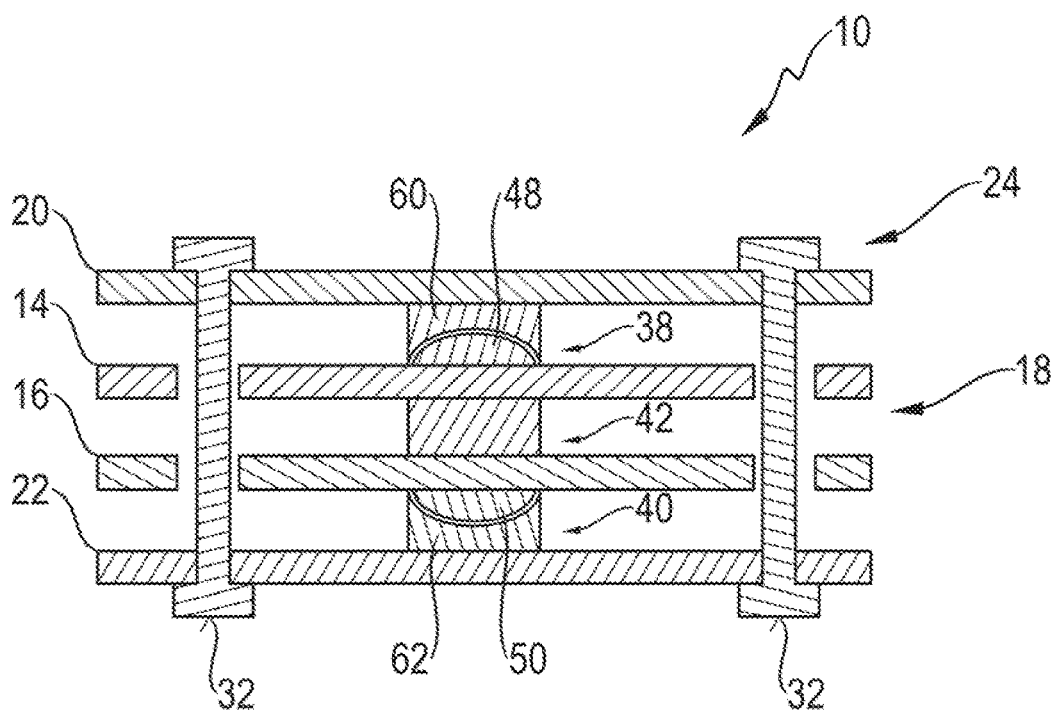
FIG. 6 shows a longitudinal sectioned view of an exhaust gas heater with carrier arrangement support units arranged between two connection elements; and, FIG. 7 shows a cut-out of an exhaust gas heater with an alternative embodiment of a carrier arrangement support unit.

FIG. 6 shows an embodiment in which the carrier arrangement support units 38, 40 and heat conductor support unit 42 which provide together with a heat conductor support unit 42 a stack of support units which extends in the direction of the exhaust gas heater longitudinal axis are not arranged in the region of a connection element 32 in each case, but instead in a region which is located between two or more connection elements 32. A greater freedom with respect to the positioning of the various support units is thereby enabled. A limiting to the position of the support elements is not required.

Figure 7:
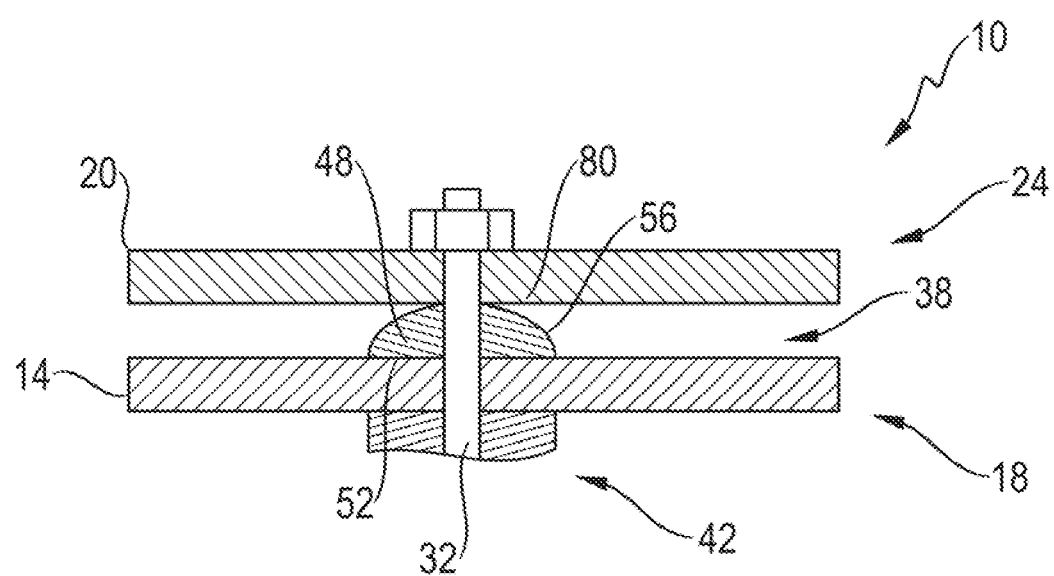

An alternative embodiment of a carrier arrangement support unit is illustrated in FIG. 7 by way of example with reference to the carrier arrangement support unit 38. The carrier arrangement support unit 38 includes the first carrier arrangement support element 48 which is constructed with the convex-curved first support face 56 and the substantially planar or non-curved heat conductor support face 52 from electrically insulating material. In this embodiment, the counter-piece, that is, the second carrier arrangement support element 50, is also provided by the carrier arrangement 24 or the carrier element 20 thereof. In this instance, however, the carrier element 20 does not have a curved support face but instead a substantially non-curved second support face 80, against which the convex-curved first support face 56 abuts and can roll in the event of relative movements.

In this embodiment, the first carrier arrangement support element 48 could also be positioned in such a manner that it abuts with the convex-curved first support face 56 thereof against the heat conductor 14 and is supported with the substantially non-curved rear side on the carrier element 20. It is self-evident that in this embodiment, in association with the heat conductor 16 or the carrier element 22, the or each second carrier arrangement support unit 50 could also be constructed in this manner.

Finally, it should be noted that naturally different variants can be combined with each other. Thus, for example, the carrier arrangement support unit 38 which is illustrated in FIG. 3 could be arranged between the carrier element 20 and the heat conductor 14 whilst the carrier arrangement support unit 40 illustrated in FIG. 4 could be provided between the heat conductor 16 and the carrier element 22. In association with various connection elements 32, various types of carrier arrangement support units could also be provided. When a carrier arrangement support element is integrated in a carrier element 20 or 22, this carrier arrangement support element could provide a convex-curved first support face whilst a respective concave-curved second support face could be provided on the other carrier arrangement support element which is then made from electrically insulating material.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of an internal combustion engine, the exhaust gas heater defining an exhaust gas longitudinal axis (L) and comprising:
   a carrier arrangement and a heat conductor arrangement carried on said carrier arrangement;
   said heat conductor arrangement having at least one heat conductor for conducting a current flow therethrough;
   said carrier arrangement comprising two carrier elements receiving said heat conductor arrangement therebetween in the direction of said exhaust gas heater longitudinal axis (L);
   a plurality of carrier arrangement support units carrying said at least one heat conductor in an electrically insulating manner with respect to each of said carrier elements;
   at least one of said carrier arrangement support units including a first carrier arrangement support element having a curved first support face and a second carrier arrangement support element having a curved second support face;
   wherein,
   in said at least one of said carrier arrangement support units, said first carrier arrangement support element has a substantially non-curved heat conductor support face supported at one heat conductor of said at least one heat conductor of said heat conductor arrangement and, at a side facing away from said at least one heat conductor of said at least one heat conductor of said heat conductor arrangement, has said curved first support face and said second carrier arrangement support element has a substantially non-curved carrier arrangement support face supported at said carrier arrangement and, at a side facing away from said carrier arrangement, has said curved second support face supported at said curved first support face of said first carrier arrangement support element.

2. The exhaust gas heater of claim 1, wherein one support face of said first and second support face is a convex-curved support face and the other support face of said first support face and second support face is a concave-curved support face.

3. The exhaust gas heater of claim 1, wherein, in said at least one of said carrier arrangement support units of, at least one of said first and second carrier arrangement support elements is made from electrically insulating material.

4. The exhaust gas heater of claim 1, further comprising:
   said at least one of said carrier arrangement support units being a first carrier arrangement support unit;
   a second carrier arrangement support unit;
   said at least one heat conductor being a first heat conductor and said heat conductor arrangement including a second heat conductor;
   said first and second heat conductors being arranged successively in the direction of said exhaust gas heater longitudinal axis (L) so as to be mutually adjacent;
   said first heat conductor being supported via said first carrier arrangement support unit with respect to one of said carrier elements and said second heat conductor being supported via said second carrier arrangement support unit with respect to the other one of said carrier elements; and,
   at least one heat conductor support unit being arranged between said first and second heat conductors.

5. The exhaust gas heater of claim 4, wherein, said at least one heat conductor support unit includes at least one of the following:
   i) at least one heat conductor support element made from electrically insulating material; and,
   ii) in association with each heat conductor, which is supported on said heat conductor support element, a substantially planar heat conductor support face.

6. The exhaust gas heater of claim 1, wherein the heat conductor arrangement is connected to said carrier arrangement via at least one connection element.

7. The exhaust gas heater of claim 6, wherein said connection element extends through said at least one of said carrier arrangement support units.

8. An exhaust gas system for an internal combustion engine, the exhaust gas system comprising:
   an exhaust gas heater defining an exhaust gas heater longitudinal axis (L) and including:
   a carrier arrangement and a heat conductor arrangement carried on said carrier arrangement;
   said heat conductor arrangement having at least one heat conductor for conducting a current flow therethrough;
   said carrier arrangement comprising two carrier elements receiving said heat conductor arrangement therebetween in the direction of said exhaust gas heater longitudinal axis (L);
   a plurality of carrier arrangement support units carrying said at least one heat conductor in an electrically insulating manner with respect to each of said carrier elements;
   at least one of said carrier arrangement support units including a first carrier arrangement support element having a curved first support face and a second carrier arrangement support element having a curved second support face;
   wherein,
   in said at least one of said carrier arrangement support units said first carrier arrangement support element has a substantially non-curved heat conductor support face supported at one heat conductor of said at least one heat conductor of said heat conductor arrangement and, at a side facing away from said at least one heat conductor of said at least one heat conductor of said heat conductor arrangement, has said curved first support face and said second carrier arrangement support element has a substantially non-curved carrier arrangement support face supported at said carrier arrangement and, at a side facing away from said carrier arrangement, has said curved second support face supported at said curved first support face of said first carrier arrangement support element.

\* \* \* \* \*

UNITED STATES PATENT AND TRADEMARK OFFICE
CERTIFICATE OF CORRECTION

PATENT NO. : 11,873,747 B2
APPLICATION NO. : 17/822478
DATED : January 16, 2024
INVENTOR(S) : Häberle et al.

It is certified that error appears in the above-identified patent and that said Letters Patent is hereby corrected as shown below:

On the Title Page

<u>Under Item (12)</u>:
"Haberle et al." should read -- Häberle et al. --.

<u>Under Item (72) Inventors</u>:
Line 1: "Haberle" should read -- Häberle --.

In the Claims

<u>In Column 7</u>:
Line 49: delete "units of," and insert -- units, -- therefor.

Signed and Sealed this
Nineteenth Day of March, 2024

Katherine Kelly Vidal
*Director of the United States Patent and Trademark Office*